United States Patent
Yu et al.

(10) Patent No.: US 7,289,956 B2
(45) Date of Patent: Oct. 30, 2007

(54) SYSTEM AND METHOD FOR USER MODELING TO ENHANCE NAMED ENTITY RECOGNITION

(75) Inventors: Dong Yu, Kirkland, WA (US); Peter K. L. Mau, Bellevue, WA (US); Kuansan Wang, Bellevue, WA (US); Milind Mahajan, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/445,532

(22) Filed: May 27, 2003

(65) Prior Publication Data

US 2004/0243407 A1    Dec. 2, 2004

(51) Int. Cl.
*G10L 15/14* (2006.01)
(52) U.S. Cl. .......................... 704/240; 704/4
(58) Field of Classification Search ...................... None
See application file for complete search history.

(56) References Cited

U.S. PATENT DOCUMENTS

| | | | | |
|---|---|---|---|---|
| 5,329,609 A | * | 7/1994 | Sanada et al. | 704/251 |
| 5,819,265 A | * | 10/1998 | Ravin et al. | 707/5 |
| 6,311,152 B1 | * | 10/2001 | Bai et al. | 704/9 |
| 2003/0083862 A1 | * | 5/2003 | Hu et al. | 704/9 |
| 2004/0111264 A1 | * | 6/2004 | Wang et al. | 704/257 |

OTHER PUBLICATIONS

Derek Lam et al., Exploiting e-mail structure to improve summarization: ACM 2002 Conference on Computer Supported Cooperative Work, Nov. 16, 2002.
Zheng Chen et al., A new statistical approach to personal name extraction: ICML 2002.
Andrie Mikheev et al. "Named entity recognition without gazetteers" Proceedings of EACL 99. Jun. 8, 1999.
Dong Yu et al., "Improved name recognition with user modeling" 8th European Conference on Speech Communication and Technology, Sep. 1, 2003.
Stephanie Elzer et al., Recognizing and utilizing user preferences in collaborative consultation dialogues. Proceedings of the Fourth International Conference on User Modeling Aug. 11, 1994. pp. 19-24.
Andrew Borthwick et al., Exploiting diverse knowledge sources via maximum entropy in named entity recognition: In Proceedings of the Sixth Workshop on Very Large Corpora. Aug. 11, 1998.
Jian Sun et al., Chinese named entity identification using class.based language model Proceedings of the 19th International Conference on Computational Linguistics. vol. 1, Aug. 24, 2002 pp. 1-7.
European Search Report for Application No. 04010931.6 dated Jan. 6, 2006.

* cited by examiner

*Primary Examiner*—Abul K. Azad
(74) *Attorney, Agent, or Firm*—Joseph R. Kelly; Westman, Champlin & Kelly, P.A.

(57) ABSTRACT

The present invention employs user modeling to model a user's behavior patterns. The user's behavior patterns are then used to influence named entity (NE) recognition.

30 Claims, 5 Drawing Sheets

SYSTEM AND METHOD FOR USER MODELING TO ENHANCE NAMED ENTITY RECOGNITION

BACKGROUND OF THE INVENTION

The present invention deals with named entity recognition. More specifically, the present invention deals with modeling user patterns to enhance the recognition of named entities.

A named entity (NE) is a specific linguistic item, such as a proper name, the name of a company, an email address, a location, etc., which is treated as one unit by an application. Named entity recognizers are known, and named entity processing is known to be an important stage of linguistic analysis.

NE recognition is currently done in a number of ways. Some approaches for NE recognition use list look up when NEs are fixed (or static) such as city names, country names, first names, company names, fixed terms like product names, etc. Other approaches use regular expressions and grammar rules that can combine syntactic information with a lexicon or list look up in order to recognize NEs. Most common approaches build finite-state recognizers directly from training data.

Personal information management (PIM) continues to be a major application area of automatic speech recognition. In PIM systems, NE recognition is an important task. For example, speech enabled electronic mail programs rely on NE recognition. Processing in these applications requires the recognition of many NEs, such as email recipients. Similarly, some PIMs involve voice dialing of telephones, scheduling, etc. which also require NE recognition.

NE recognition, in general and in the domain of speech recognition engines, poses a number of problems. First, NE users may have access to a very large number of names or other terms that constitute NEs. For example, there are many distinct proper names in any given corporation or community. This leads to a very large perplexity, which in turn leads to a large error rate in the NE recognition task.

Another difficulty involves names not in the standard dictionary. It is extremely difficult to create a dictionary that contains every name in the world, or even all English sounding names. Even if such a dictionary exists, because of the vast number of possible pronunciations it would contain, using such a dictionary would significantly lower recognition accuracy.

Another difficulty presented in NE recognition is that there can be many different ways to refer to a single person. For example, different people refer to a single person in different ways. Some may call a person by his or her first name, while others may refer to the person with both the first and second names and still others may refer to the same person in different ways, such as using the first name and last initial or such as by using nicknames, etc. Moreover, a single person may refer to other people in multiple different ways. For example, a person may refer to one of his or her neighbors or coworkers using only the first name, while referring to another neighbor or coworker using only the last name.

Still another difficulty presented by NE recognition is ambiguity when only a first name is used. There are many common first names, and even if an NE recognizer (such as an automatic speech recognition system) correctly recognizes the word which forms the first name, the user may still be frustrated. For example, if the user speaks the word "David", the automatic speech recognition system may accurately recognize the word "David" as a NE. However, in a large company there may be many people with the first name "David" and the user would then be required to hunt through a list of "David's" presented by the recognizer (and typically alphabetized by last name) to find the proper one.

SUMMARY OF THE INVENTION

The present invention employs user modeling to model a user's behavior patterns. The user's behavior patterns are then used to influence named entity (NE) recognition.

In one embodiment, user modeling is performed across applications. In that embodiment, data generated from, or somehow related to, the user is obtained from a variety of sources. Those sources can include a speech recognition system, applications, and other sources. Named entities are identified in the data and probabilities are generated for each identified named entity. The probabilities generated are used to influence subsequent named entity recognition.

In one embodiment, the named entities are identified in the collected data intermittently based on one of a variety of different triggers. The triggers can include a user action, an application action, a timer, an amount of data collected, or another trigger.

In one embodiment, the probabilities associated with the named entities vary based on context and the time the data was created. In still another embodiment, the collected data is weighted, based on the source of the data.

In another embodiment, the named entities are integrated into grammars, such as probabilistic context free grammars. The named entities can also, or alternatively, be integrated into a language model, such as a dictation language model, or can be added to a user lexicon. Further, the named entities can be integrated in other ways, such as linked to text boxes as part of a drop down list (or other controls to provide an auto-complete list sorted by learned probabilities), or for command and control as part of the commands.

DETAILED DESCRIPTION OF ILLUSTRATIVE EMBODIMENTS

The present invention relates to a system for employing user modeling to generate a named entity (NE) list (or NE model). The present invention also relates to a system for integrating and using the NE model. However, prior to discussing the present invention in greater detail, one illustrative environment in which the present invention can be used is described.

Figure 1:
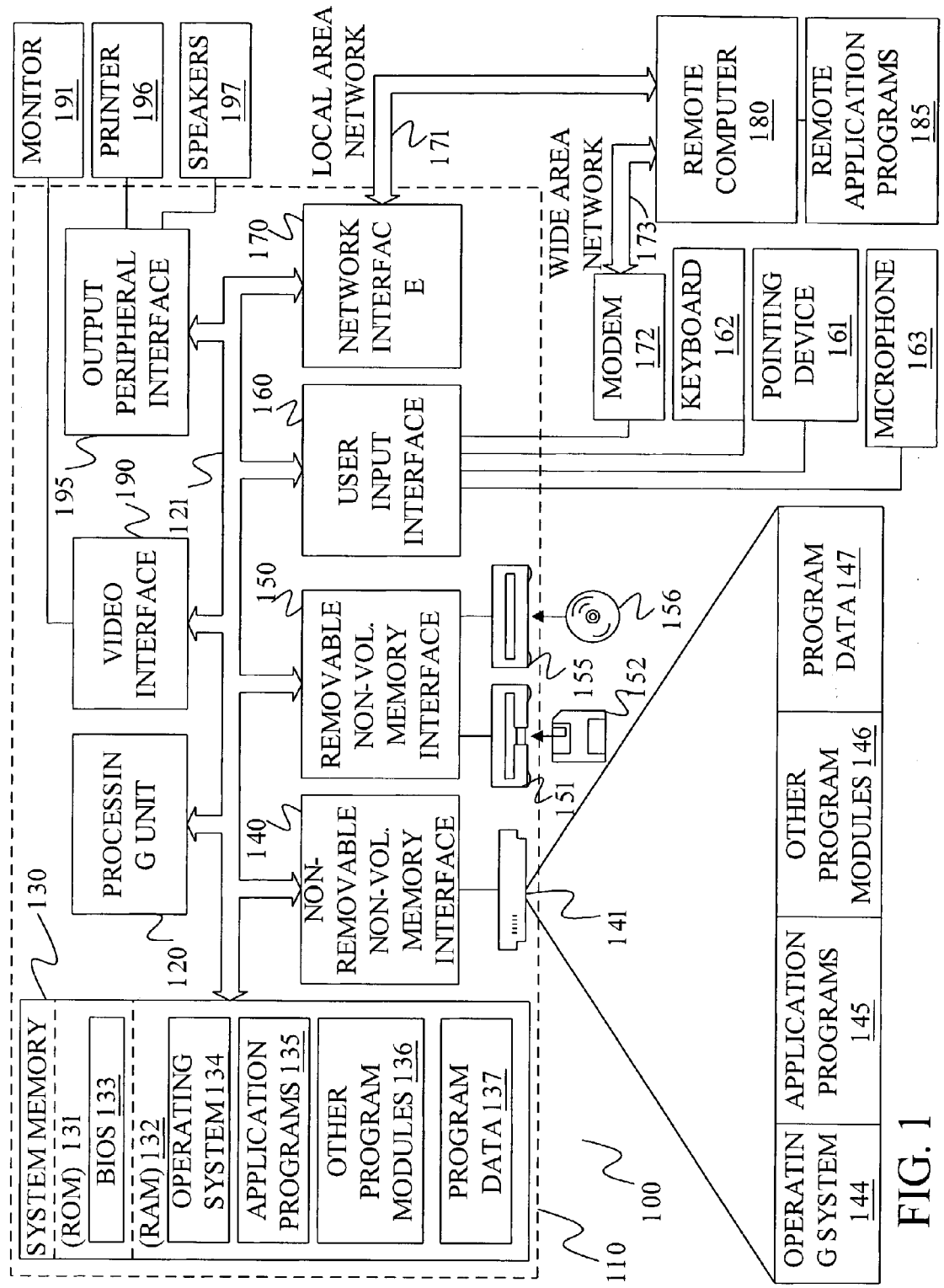
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
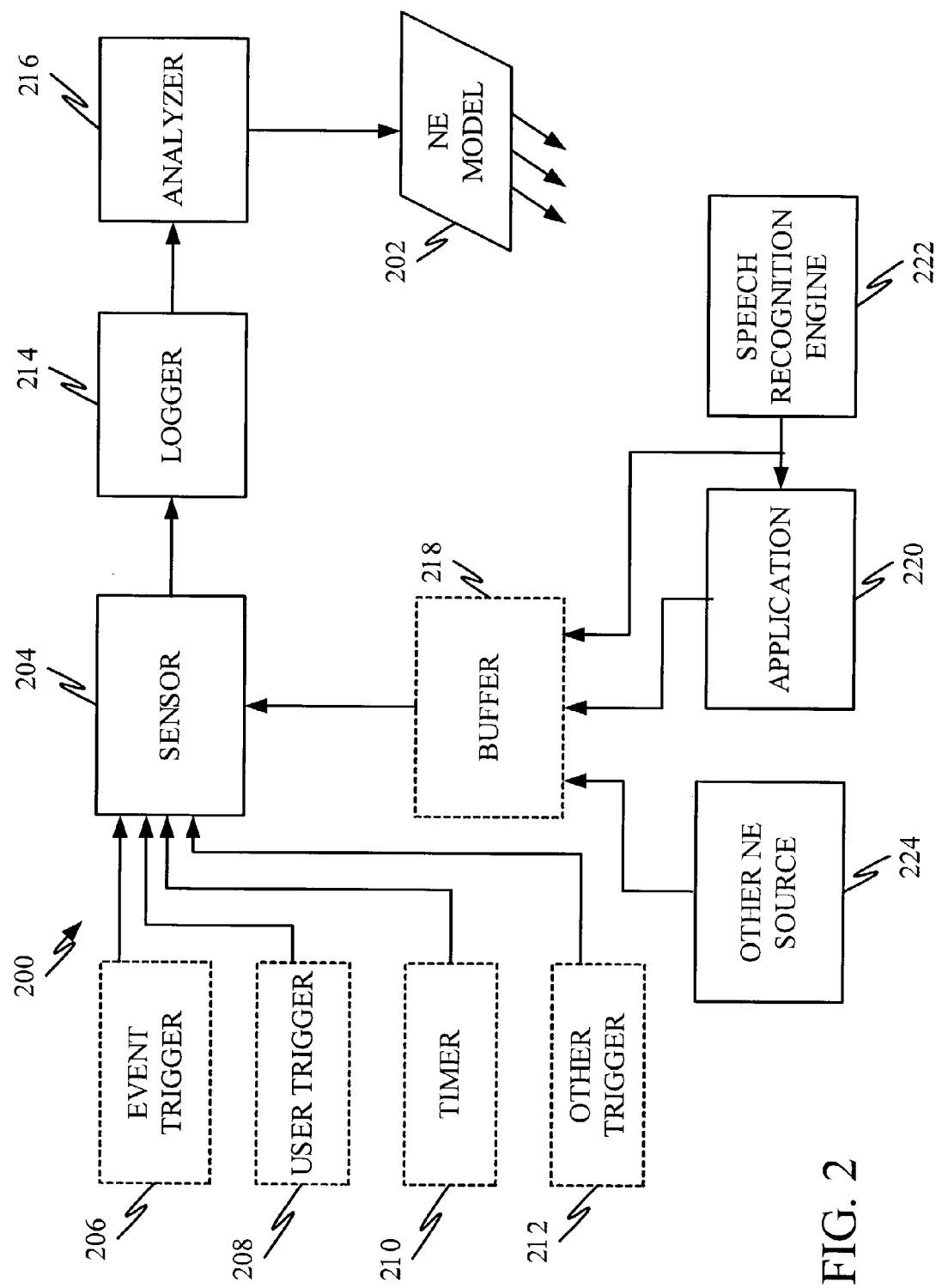
FIG. 2 is a block diagram of a system for generating a named entity list (or named entity model).

FIG. 2 is a block diagram of a system 200 for generating a named entity (NE) list, or NE model 202. System 200 includes sensor 204 which is triggered by one of a variety of different optional triggers, such as event trigger 206, user trigger 208, timer 210 or some other trigger 212. System 200 also includes logger 214 analyzer 216, and optional buffer 218. It should be noted that sensor 204, logger 214 and analyzer 216 are shown separately, but could be combined or in some implementations omitted. FIG. 2 also illustrates that data can be collected from a variety of sources such as, for example, applications 220, speech recognition engine 222, or other sources 224 of NEs.

Figure 3:
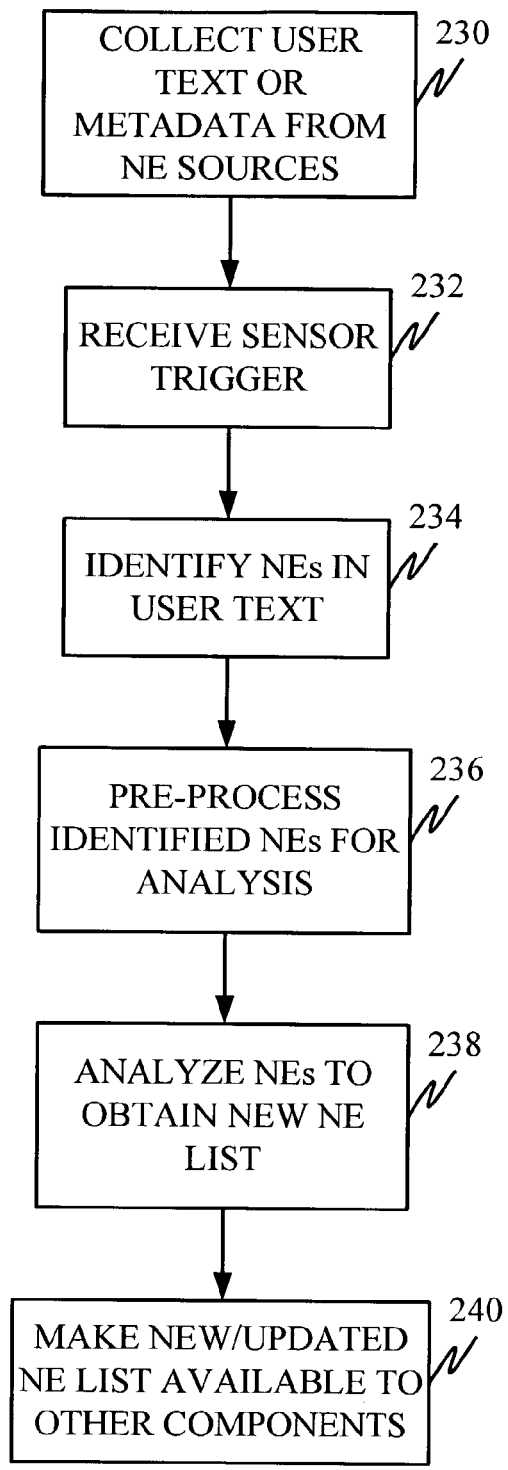
FIG. 3 is a flow diagram illustrating the operation of the system shown in FIG. 2.

FIG. 3 is a flow diagram illustrating one embodiment of the operation of system 200 shown in FIG. 2. As will be described, system 200 models a user's usage pattern to identify NEs and calculate a probability associated with each of the NEs. This NE list and associated probabilities (or NE model) 202 can subsequently be used for NE recognition across different applications or in different contexts.

In order to generate NE model 202, data representing the particular user's usage patterns is collected. This is indicated by block 230 in FIG. 3. FIG. 2 shows that the sources can include applications 220, such as word documents, electronic mail applications, metadata or information from various fields in the electronic mail applications (such as the "to" field, the "cc" field, or the "from" field) scheduling applications, contact lists, etc. Also, applications 220 can be mapping or geography applications, in which case the city, state, and other location names can be collected from the application.

Similarly, FIG. 2 shows that where the system used by the user includes speech recognition engine 222, one source of collected data showing the user's usage pattern can be the speech recognition engine 222. The data representing the recognition results can be provided to sensor 204 either through a speech enabled application 220, or directly from speech recognition engine 222.

Other NE sources 224 can also provide data to sensor 204 that represent the user's usage patterns. Of course, the data can be provided directly from sources 220, 222, and 224 to sensor 204, or it can be buffered in optional buffer 218.

In one illustrative embodiment, all of the sources 220, 222 and 224 of NEs will provide NEs that are relevant to the specific user being modeled. For example, the email recipients identified in the "to", "cc" and "from" fields of the email application can be those from emails generated or received by the user. In addition, the user's contact list, or other similar type of database identifying people that the user often contacts, can be used as a source for NEs as well. Similarly, company-wide name directories can be used as well. In many companies, the name directories are in electronic form and are arranged by working group, division, or other corporate unit or working unit. In that case, the names in the same unit as the user can be used as a source of NEs that are closely related to the user. Further, if the NE source is a mapping application, the locations selected, or "checked on" by the user can be used as information closely related to the user. Also, locations closely proximate the user's location can be used as well, or locations provided by a positioning system, such as a global positioning system (GPS).

In addition to sources of NEs that are tightly related to the specific user, other sources of NEs can also be used which are not as tightly related to the user. For example, all names in the company-wide address books can be used. Similarly, popular or famous locations from a mapping application can be used, even though they are not tightly related to the specific user. In addition, where information that is not tightly related to the user is included as a source of NEs, that information can be weighted less than the information that is tightly related to the user. For example, if the company-wide address book is used as a source of NEs, all other names in the address book can be given less weight than those in the working group of the specific user, or than those derived from another tightly related source, such as the user's email application. Similarly, where popular and famous locations are used as the source of NEs from a mapping application, they can be weighted less than those which the user has actually selected or "clicked on" in the mapping application. Thus, the present invention is not limited to only sources of NEs which are tightly related to a specific user.

Still other NE sources can be used as well. Some word processors or operating systems maintain a "Frequently Used List" which is a list of frequently used items (such as documents). Other systems such as browsers maintain a "History List" that lists the most recently used items (such as the most recently visited site). The NEs obtained from these sources may illustratively be names that identify documents, web addresses, project names, user names, etc.

It should also, of course, be understood that the NEs discussed herein are not limited to proper nouns but can include other references to people, locations, etc., as well. For example, a named entity can be identified as "my manager" or "Joe's manager". A named entity can also be identified as "my direct reports", etc.

In any case, once information that reflects the user's usage pattern has been collected, sensor 204 receives a sensor trigger input indicating that it is time to process the collected information to identify NEs therein. This is indicated by block 232 in FIG. 3. FIG. 2 shows that there are a wide variety of triggering mechanisms that could be used to trigger sensor 204 to identify NEs in the collected data. For example, event trigger 206 can be an application generated trigger that triggers the sensor 204 based on the application's events. In an electronic mail application, for instance, both send and receive may be events which trigger sensor 204 to search through the collected data to identify NEs. Event trigger 206 can also, of course, include any of a wide variety of other events, such as power up, power down, operating system events, etc.

The triggers can also include user generated triggers 208. One example of a user generated trigger 208 is the user saving a document in a word processing application. Once the user has initiated the save operation, the document can be provided to sensor 204 (optionally through buffer 218) and sensor 204 then processes the document (and other collected information) identifying NEs therein.

Still another trigger can include a timer 210. In that embodiment, the timer is simply reset every time sensor 204 has processed collected data. When the timer 210 elapses, it again triggers sensor 204 to check for NEs in the collected data.

Still other triggers 212 can be used to trigger sensor 204. For instance, where speech recognition engine 222 is used, the speech recognition engine 222 illustratively outputs an indication that it has obtained a recognition result. That indication can serve as a trigger to sensor 204 and it can then process the recognition result to identify NEs therein.

Other triggers 212 can include a wide variety of additional triggers. For example, the amount of data collected in buffer 218 can simply be monitored based on its volume. When a sufficient volume of data has been collected, this can be used to trigger sensor 204 to process the collected data to identify NEs.

Of course, it should also be noted that any of the triggers 206-212 can be used by themselves, or in combination with any or all of the other triggers, or additional triggers.

Once sensor 204 has been triggered, it processes the collected data from sources 220, 222 and 224 and identifies NEs in that data. This is indicated by block 234 in FIG. 3. Identifying NEs can be done in any of a wide variety of known ways, and the particular method by which NEs are identified by sensor 204 does not form part of the present invention. For example, some systems identify NEs by performing linguistic analysis on the text under consideration. The linguistic analysis is provided with an algorithm defining criteria which specify NEs.

In any case, once the NEs are identified by sensor 204, they are provided to logger 214. Logger 214 preprocesses, and optionally stores, the NEs for further analysis by analyzer 216. In one embodiment, logger 214 normalizes the NEs for further analysis, such as by converting the words in the NEs to their canonical forms. Logger 214 can then store the normalized NEs until they are retrieved by analyzer 216. In that embodiment, logger 214 can store the NEs in any suitable form, such as an XML file, or other form. Alternatively, logger 214 can provide the normalized NEs to analyzer 216 for immediate analysis.

Analyzer 216 analyzes the normalized NEs provided by logger 214 and either creates or updates NE list (or NE model) 202. NE model 202 is then available to any other components of the system that wish to take advantage of it, such as application 220, speech recognition engine 222, other sources 224, or any other component of the system used by the user. Analyzing the NEs to obtain the new NE list is indicated by block 238 in FIG. 4. Making the new or updated NE list 202 available to other components of the system is indicated by block 240.

Prior to discussing the analysis of the NEs in greater detail, it should be noted that NE model 202 can be generated off-line, on-line, or both. For example, in one embodiment, NE model 202 is initially created and can subsequently be optimized off-line. In that embodiment, the initial model is built off-line by processing information from sources 220-224, which is available in an off-line environment. Such sources can include, for example, past emails sent by the particular user, the user's contact list, the user's company directory, prior documents authored by the user, etc. Similarly, NE model 202 can be initialized with certain information from other sources, such as famous locations from a map application, cities in a geographic region close to the user, etc.

Even if the initial model 202 is generated or adapted off-line, it can also be generated or adapted in an on-line environment. That can be preformed as illustrated with respect to FIGS. 2 and 3. In other words, real time triggers are provided so the sensing, logging and analyzing can be done synchronously with operation of the system.

Figure 4:
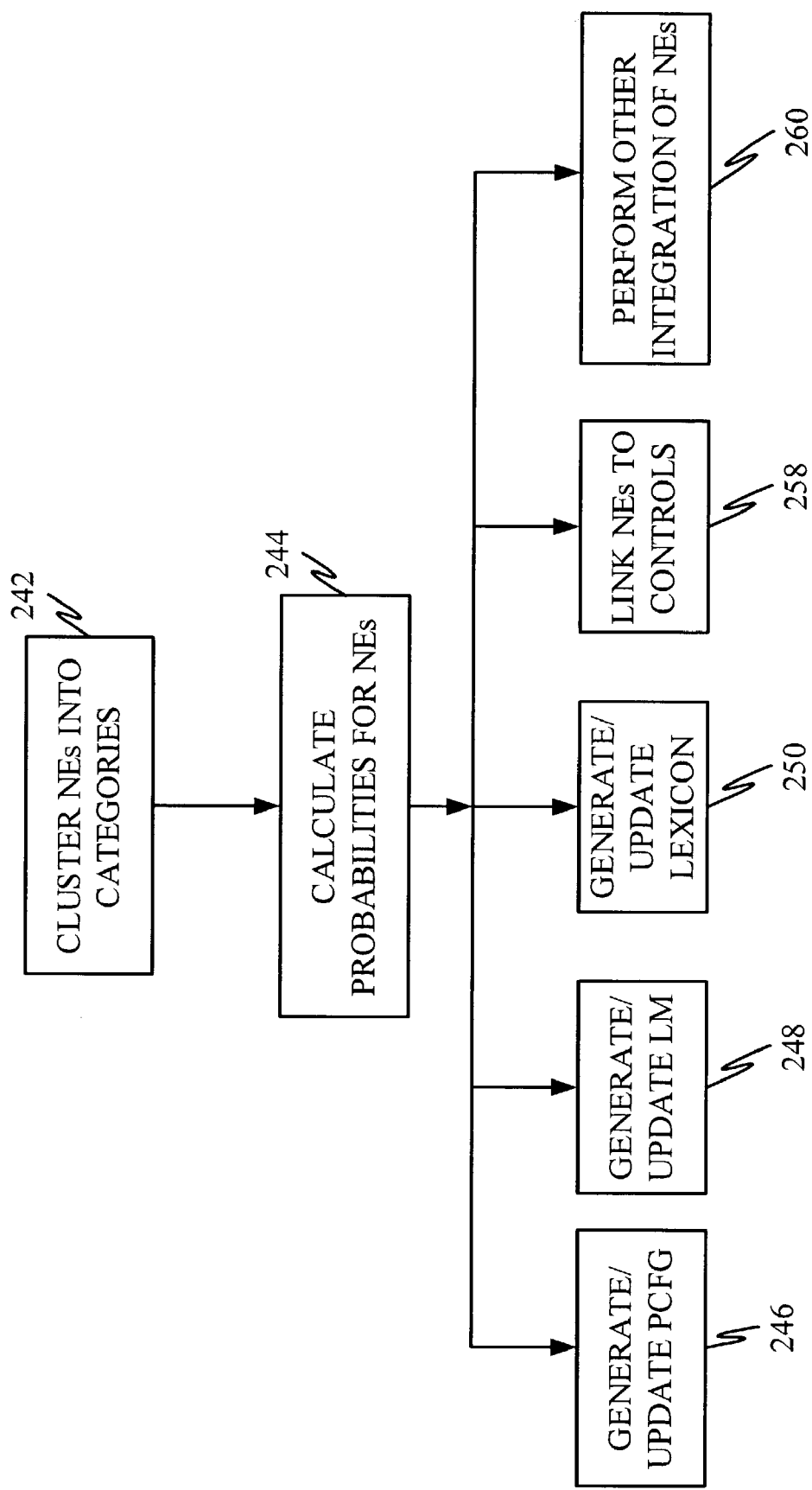
FIG. 4 is a flow diagram illustrating analysis of NEs in order to obtain and integrate an NE list.

The analysis of NEs performed by analyzer 216 will now be discussed in greater detail with respect to FIG. 4. FIG. 4 shows a flow diagram illustrating a plurality of different embodiments for analyzing NEs. In one embodiment, the normalized NEs provided by logger 214 are first clustered by analyzer 216 into a plurality of different categories. This is indicated by block 242 in FIG. 4.

Some exemplary categories include a people category and a location category. The people category may include, for example, not only the proper names of people but also secondary references to people, such as "my boss" etc. The location category can include cities, states, schools, and other locations, which are not necessarily proper names, such as attractions, and popular sites.

The NEs can also be associated with properties, based upon the category they are placed in. For example, the people category can have properties such as first name, last name and email address. The location category can include properties such as address, geographic location, etc.

The clustering can be performed in any of a wide variety of manners. One exemplary way to cluster the NEs is based on the context from which the information was extracted. For example, names from a contact or mailing list can be placed in the people category based on the fact that they come from the contact or mail list. City names from a map application can be placed in the location category based on the fact that they come from map application. Addresses obtained from an address field of an address book can, for example, also be placed in the location category. Similarly, the clustering can be based on a linguistic analysis of documents analyzed. For example, if text or word processing documents are analyzed, a linguistic analysis may indicate that a particular named entity is a location. That indication can be used by analyzer 216 to cluster that named entity into the proper category.

It should also be noted, of course, that some named entities may be placed into several different categories. For example, some named entities can have different meanings in different contexts. If the word "Washington" is retrieved from a mapping application, for instance, it can be placed in the location category. However, if the word "Washington" is also retrieved from a contact list, it may well be placed in the people category as well.

One reason for clustering the NEs into different categories is not only to increase the efficiency of the operation of the model 202, but also to assist in the integration of the model into different types of usage scenarios. For example, the categories will have semantic meaning. Thus, the categories in which the NEs reside can be used as a class in a class-based language model. Similarly, the categories can be used as a class in a context free grammar.

Figure 5:
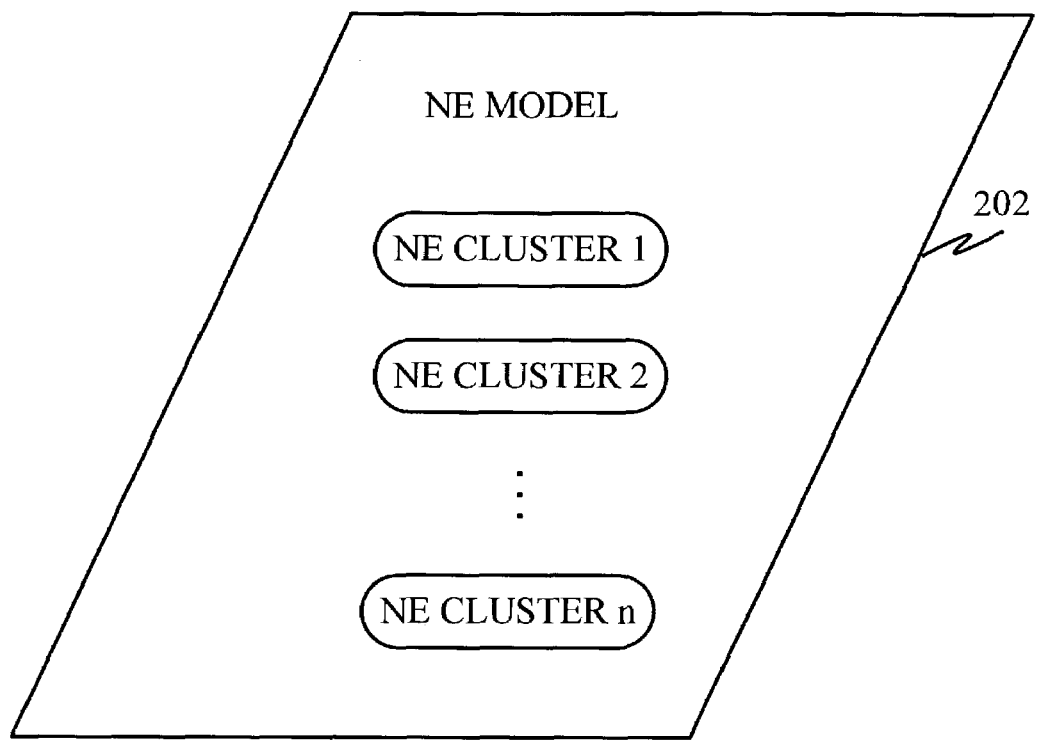
FIG. 5 is one illustrative embodiment of an NE list or NE model.

FIG. 5 illustrates one diagrammatic view of NE model 202 after it has been clustered. The NEs are clustered into clusters 1-n shown in model 202. Of course, as described above, certain NEs can be clustered into multiple different clusters as well.

In any case, once the NEs have been clustered into categories, a probability is calculated for the NEs. This is indicated by block 244 in FIG. 4. The probabilities can be based on the frequency with which the user uses a particular NE. However, the probability can be based on other factors as well. For example, different NEs may have different probability estimations when used by different applications or contexts. For example, in a mapping application, the probability of a location NE can be based not only on the frequency that the specific location NE has been accessed by the current user, but also based on a popularity measure indicative of a popularity of that location among the general public, and on a distance measure indicative of a distance of that location from the residence or current domicile of the user.

As another example, NEs that are used in an email application can have a probability that is based not only on the frequency with which the user generates emails to a particular NE, but the probability may also be based on how close the particular NE is to the specific user in a company's organizational chart, and how recently the NE has been used. The closer the NE is to the user, the higher the probability.

Of course, these are only examples of how a probability calculation can be different, based on the particular application using NE model 202.

In addition, in order to calculate the probabilities for the NEs, analyzer 216 can weigh information from different sources differently. For example, as briefly discussed above, when calculating the probability for NEs extracted from the various sources of NEs, that information can be weighed based on its closeness to the specific users. As one specific instance, if the NEs used in calculating the probability were extracted from an email application, then those names which are on a user-specific short list of names which include only the names to which the user has sent emails in the past may be given the highest weight. NEs extracted from associated names in emails sent to the user or a directory of the user's working group may be given a second highest weight. NEs extracted from a company-wide address book may be given the least weight.

Similarly, the weights can be determined based on a fall-in rate of the specific NE. In other words, if the NE falls in an email recipient grammar generated from the user's short list of NEs, it can be assigned a specific weight. If it falls in a recipient grammar generated for the user's working group list, it can be assigned the second weight, and if it falls in a grammar generated for the company-wide address book, it can be assigned the third weight. The weights can use, as a floor, a rejection threshold, and out of vocabulary NEs can still be provided with some estimated probability to accommodate for unseen training data.

A specific example may be helpful. Assume a typical speech recognition engine recognizes speech based on the following criteria:

$$\hat{w} = \underset{w}{\mathrm{argmax}}\ P(A\,|\,w)P(w) \qquad \text{Eq. 1}$$

where A is the acoustic feature representation received, w is a candidate word, and P(w) is a prior probability (such as a language model probability) for the candidate w.

User modeling in accordance with one embodiment of the present invention estimates the prior probabilities based on a user's usage history, and hence reduces the perplexity and increases recognition accuracy. The following discussion relates to an example in which the speech recognition of an email recipient is the task being discussed. Two probabilities are estimated in the NE recognition task: The probability of the recipient and the probability of that a recipient is uttered in a particular way.

The problem of estimating the probability of recipients can be described as follows: given a series of recipients tagged with time, what is the probability of each recipient being next. In general, whether a recipient i occurred at day t can be expressed as follows:

$$x_i(t) = \sum_k \delta(t - t_{ik}), \qquad \text{Eq. 2}$$

where $t_{ik}$ indicates the time of the kth occurrence that the user sent an email to recipient i, and δ is the Kronecker delta. The total number of times that the recipient i appears up to time T can be expressed as follows:

$$\begin{aligned} c_i(T) &= \sum_i x_i(t)w(T-t) \\ &= \sum_k \sum_t \delta(t - t_{ik})w(T-t) \\ &= \sum_k w(T - t_{ik}), \end{aligned} \qquad \text{Eq. 3}$$

where w(t) is a window function applied. Probabilities of recipients thus can be estimated as follows:

$$\hat{p}_i = \frac{c_i(T)}{\sum_j c_j(T)} = \frac{\sum_k w(T - t_{ik})}{\sum_j \sum_k w(T - t_{jk})} \qquad \text{Eq. 4}$$

If an underlying stochastic process is stationary, w(t) should be a rectangular window and the above estimation can be simplified to:

$$\hat{p}_i = \frac{n_i}{\sum_j n_j}, \qquad \text{Eq. 5}$$

where $n_i$ is the number of times recipient i occurred in the past.

However, the probability that recipient i is the next recipient varies over time because a user's usage patterns change. Moreover, the changing patterns are different for different recipients. For example, when a user changes groups, the user need not send emails to colleagues in the old group as often as before. However, the user may continue to send emails to non-work friends or family, just as often as he or she did in the past.

In order to compensate for the time varying characteristic of the underlying stochastic process, an exponential window is applied as follows:

Eq. 6

$$w(t) = e^{-\lambda t},$$

where $\lambda$ is a forgetting factor. The forgetting factor is so chosen that the recent data has higher weight. The larger the $\lambda$, the more weight is put on the new data. Biasing too much to new data, however, can cause an overfitting. Therefore, in one illustrative embodiment, $\lambda$ is a slow changing parameter that is automatically tuned with a held out set of data to minimize the KL distance of the held out set as follows:

$$\hat{E} = \sum_i \bar{p}_i \log \frac{\bar{p}_i}{\hat{p}_i}, \quad \text{Eq. 7}$$

where $\bar{p}_i$ is estimated based on the occurrences of recipient i in the held out set as follows:

$$\bar{p}_i = \frac{n_i}{\sum_j n_j}, \quad \text{Eq. 8}$$

The system can illustratively tune $\lambda$ in a number of different ways. In one embodiment, a gradient decent algorithm is used where the gradient is defined as follows:

$$\frac{d\hat{E}}{d\lambda} = \frac{d\left(-\sum_i \bar{p}_i \log \hat{p}_i\right)}{d\lambda}$$

$$= -\sum_i \frac{\bar{p}_i}{\hat{p}_i} \cdot \frac{d\hat{p}_i}{d\lambda}$$

$$= \sum_i \frac{\bar{p}_i}{\hat{p}_i} \cdot \left( \frac{\sum_k (T-t_{ik})e^{-\lambda(T-t_{ik})} - \hat{p}_i \sum_j \sum_k (T-t_{jk})e^{-\lambda(T-t_{jk})}}{\sum_j \sum_k e^{-\lambda(T-t_{jk})}} \right)$$

$$= \frac{\sum_i \frac{\bar{p}_i}{\hat{p}_i} \sum_k (T-t_{ik})e^{-\lambda(T-t_{ik})} - \sum_j \sum_k (T-t_{jk})e^{-\lambda(T-t_{jk})}}{\sum_j \sum_k e^{-\lambda(T-t_{jk})}}.$$

Eq. 9

To this point, the model deals with recipients that the user has actually sent emails to in the past. However, all people found in the user's contact list and all people who sent emails to the user are potential recipients, even if the user never sent emails to them in the past. For those people, the system illustratively provides a base probability which equals to the probability that the user sent email to the recipient once, a predetermined time in the past (such as, for example, 100 days ago). For such a potential recipient r, the probability is calculated as follows:

$$\hat{p}_r = \frac{\sum_k w(T-t_{ik})}{\sum_j \sum_k w(T-t_{jk})} = \frac{e^{-100\lambda}}{\sum_j \sum_k w(T-t_{jk})}. \quad \text{Eq. 10}$$

In accordance with another embodiment, during the learning process, the system 200 also learns the way that a recipient is being referred to by the specific user being modeled. The system can illustratively start with a set of rules that provides prior probabilities for all possible ways of referring to a given recipient. The system then records frequencies that a specific way is used to refer to each recipient, and updates the probabilities associated with those different ways of referring to the recipient accordingly, in a probabilistic context free grammar (PCFG) The PCFG can of course, be used by the speech recognition engine to recognize any NEs.

It will of course be appreciated that the algorithms discussed above for generating probabilities associated with NEs are only exemplary algorithms for generating such probabilities. The probabilities can be generated using any other desired algorithm as well.

After probabilities have been calculated for each of the NEs, the NEs and associated probabilities are integrated into different usage scenarios. The particular usage scenario into which the new NE list and associated probabilities are integrated will of course depend on the particular application or other component which is configured to use the NE list 202. A number of exemplary integrations will be discussed, for the sake of example only.

In one embodiment, the NE list 202 and the associated probabilities are used to generate a probabilistic context free grammar (PCFG). This is illustrated by block 246 in FIG. 4. Such a PCFG can be used in a wide variety of ways. One illustrative way is for name recognition. For example, in a speech enabled electronic mail program, where the user speaks that the recipient is "Peter", instead of providing the user with a lengthy list of all the "Peter's" in the company or the user's contact list, arranged alphabetically and requiring the user to choose one of them, the PCFG will bias to the specific "Peter" that the user has most often used as a recipient for emails, and the NE corresponding to that "Peter" is placed at the top of the list.

Another illustrative example is for command and control. For example, in a speech enabled command and control system, a user can issue the request "Send email to Peter". Instead of asking the user to specify which one of the many "Peters" in the company or the user's contact list is to be used, the system defaults to the "Peter" with the highest probability and thus increases user satisfaction by reducing required user interactions while not increasing overall error rate.

Another illustrative example of integrating the NE list and associated probabilities is to use them to generate a class-based dictation language model for the dictation of NEs. While class-based language models are known, a brief discussion of a class-based language model may be illustrative. In a traditional language model (for example, in a bi-gram or tri-gram language model) the model provides a probability of words relative to one or two other words, respectively. In a class-based language model, the model also provides a probability that a word belongs to a specific semantic class, and/or the probabilities that classes occur relative to one another and that specific words reside in those classes. Generation or updating of a dictation model (or class-based language model) is illustrated by block 248 in FIG. 4.

In yet another embodiment for integrating the NEs and associated probabilities into usage scenarios, the NEs and associated probabilities are used to augment a user's lexicon. In other words, the list of NEs and associated probabilities can simply be added as new words directly to a user's lexicon in speech recognition engine 222. Generating or augmenting the user's lexicon using the NEs and probabilities is illustrated by block 250 in FIG. 4.

Figure 6:
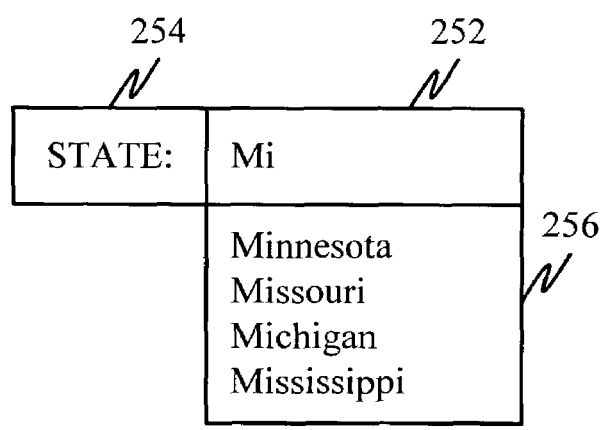
FIG. 6 illustrates one integration of the NE list by linking it to a text box.

Yet another way of integrating the NEs and probabilities into a usage scenario is to integrate them into controls. For example, even if a speech recognition engine is not used, the NEs and associated probabilities can be linked to controls in different applications or the operating system. One example of linking the NE list to a control is linking it to a text box. In one illustrative embodiment, the text box is defined by a developer with a class attribute that has a value specified by the developer. FIG. 6 illustrates one embodiment of a text box 252 that has a class attribute 254 with the value identified as a "State". The value in the class attribute corresponds to one of the categories into which the NEs are clustered by analyzer 216. Thus, when the user selects text box 252 and begins to type into it, NE model 202 outputs a list of candidate NEs for automatically completing the text box 252. In the example shown in FIG. 6, the user has typed the letters "MI". NE model 202 automatically outputs a list of NEs corresponding to States, ranked in order of the probability associated with each of those NEs. Because the probability associated with the NE "Minnesota" is the highest, that NE is displayed first in the drop down list 256 of NEs provided for automatically completing text box 252.

It should be noted that the NEs will be displayed in order of probability, even if the user has never typed into text box 252 before. This is because the NEs 202 do not have their probabilities calculated solely based on previous entries into text box 252. Instead, the probabilities are calculated from data extracted from a plurality of different sources that best model the user's usage pattern. Therefore, even if the user has never invoked text box 252 in the past, the user will still have the drop down list 256 displayed with NEs that are ranked in order of the most probable based on the user's past usage patterns across a variety of sources.

Linking NEs to controls is illustrated at block 258 in FIG. 4.

The integration of the NE list and associated probabilities discussed above is exemplary only. Of course, other integration of NEs can be performed, depending on the particular component which desires access to the NEs and probabilities. This is indicated by block 260 in FIG. 4.

It can thus be seen that, in accordance with one embodiment of the present invention, recognition of NEs is based on user modeling instead of application modeling. Information from a variety of sources employed by the user is collected and used in developing the probabilities associated with the NEs. Of course, not only can information specific to a given user be used, but other information of a more general nature can also be used. Also, as discussed above, the more general information can be given a lower weight than the more specific information in calculating the probabilities associated with the NEs. Once the NE list and associated probabilities have been generated, the list can be used across all desired applications and in all desired contexts. Thus, the present invention addresses, as a general solution, difficulties associated with NE recognition.

Finally, it should be noted that the NE list generation or adaptation system can be located on a user-specific machine. Alternately, it can be used on a server, or functions associated with the NE generation or adaptation can be split between servers or between one or more servers and the user-specific machine.

For example, in one illustrative embodiment, analyzer 216 can be implemented on a server and can gather normalized NEs from a variety of different user-specific loggers 214. All of the information can collectively be analyzed and re-distributed back to the users, or some of the information can be gathered from multiple users and analyzed at the server level while other information is analyzed on a user-specific level. Further, of course, all the information may alternatively be analyzed on the user-specific level as well.

By utilizing the present invention, it has been found that the number of NEs required for any specific user is much smaller than would otherwise be required for a general NE model. For example, a company-wide directory will have as many entries as there are employees of the company. In a company with, for example, 20,000 entries, the NEs extracted from the company directory would number 20,000. However, by analyzing the user's usage patterns, it may be found that the user only uses 250 of those NEs. Therefore, the number of NEs in the model, in accordance with the present invention, is much smaller than in previous systems.

In addition, the present invention also drastically reduces the out of vocabulary rate associated with prior systems. For instances, even if the user had the NEs associated with the entire company directory (which may number 20,000, for instance), the user may be just as likely to send electronic mail messages to personal acquaintance or family members, which are not found in the company directory. However, again, by analyzing the user's usage patterns, those NEs will also be identified and added to the user's specific NE list. Thus, even though the number of NEs in the user's list is drastically reduced over prior systems, the out of vocabulary rate is also drastically reduced. The perplexity is reduced and the accuracy is increased.

Although the present invention has been described with reference to particular embodiments, workers skilled in the art will recognize that changes may be made in form and detail without departing from the spirit and scope of the invention.

What is claimed is:

1. A named entity (NE) list generator, comprising:
   a NE identifier configured to receive information from a plurality of different sources and to identify NEs in the information, at least one of the plurality of different sources of the information including a plurality of NEs referred to by a given group of users; and
   an analyzer calculating probabilities associated with the identified NEs to obtain a user group-specific NE list, specific to the given group of users, with associated probabilities.

2. The NE list generator of claim 1 wherein the given group of users comprises a single given user.

3. The NE list generator of claim 1 wherein the sensor is configured to identify NEs in the information based on a trigger input.

4. The NE list generator of claim 3 wherein at least one of the plurality of different sources comprises an application program.

5. The NE list generator of claim 4 wherein the trigger input comprises:

an application-generated trigger input, generated by the application program.

6. The NE list generator of claim 5 wherein the application comprises an electronic mail application and wherein the application-generated trigger comprises a send or receive event.

7. The NE list generator of claim 3 wherein the trigger input comprises a user-generated trigger input.

8. The NE list generator of claim 7 wherein at least one of the plurality of different sources comprises a word processing application and wherein the user-generated trigger input comprises a save document input.

9. The NE list generator of claim 3 wherein at least one of the sources comprises a speech recognition engine.

10. The NE list generator of claim 9 wherein the trigger input comprises a recognition result indication from the speech recognition engine.

11. The NE list generator of claim 3 wherein the trigger input comprises a timer input indicating that a desired time period has elapsed.

12. The NE list generator of claim 3 wherein the trigger input is based on a volume of information collected for processing by the NE identifier.

13. The NE list generator of claim 1 wherein the analyzer is configured to calculate the probabilities by weighting information based on the source of the information, and based on how closely the source is related to the given group of users.

14. The NE list generator of claim 13 wherein a first of the plurality of sources of information provides closely related information that is closely related to the given group of users and a second of the plurality of sources of information provides loosely related information that is more loosely related to the given group of users than the closely related information.

15. The NE list generator of claim 14 wherein the analyzer is configured to weight the closely related information more heavily in calculating the probabilities than the loosely related information.

16. The NE list generator of claim 1 wherein the NE list and probabilities are configured for integration into a plurality of different system components and wherein the analyzer calculates the probabilities based on system components in which the NE list and probabilities are integrated.

17. The NE list generator of claim 1 wherein the analyzer is configured to generate a probabilistic context free grammar from the NE list and probabilities.

18. The NE list generator of claim 1 wherein the analyzer is configured to cluster the identified NEs into groups.

19. The NE list generator of claim 18 wherein the analyzer is configured to generate a class-based language model from the NEs and probabilities and wherein the groups each correspond to a semantic class in the class-based language model.

20. The NE list generator of claim 1 wherein the analyzer is configured to generate a lexicon for a speech recognition engine based on the NEs and probabilities.

21. The NE list generator of claim 1 wherein the analyzer is configured to link the NE list and probabilities to controls.

22. A method of generating a named entity (NE) model, comprising:
receiving information from a source indicative of NE usage patterns of a given user, the NE usage patterns being indicative of a set of NEs referred to by the given user, wherein receiving information comprises receiving information from a plurality of different sources; and
generating a user-specific NE model, specific to the given user, based on the information received, wherein generating comprises identifying NFs in the information received and calculating a probability associated with each NP based on the information received, and wherein calculating the probability comprises calculating by weighting and information received differently based on the source from which it was received.

23. The method of claim 22 wherein generating a user-specific NE model comprises:
clustering identified NEs into one or more of a plurality of clusters.

24. The method of claim 23 wherein clustering comprises:
placing the NEs into clusters based on a source from which the NEs were identified.

25. The method of claim 23 wherein generating a user-specific NE model comprises:
generating a probabilistic context free grammar.

26. The method of claim 23 wherein generating a user-specific NE model comprises:
generating a class-based language model.

27. The method of claim 23 wherein generating a user-specific NE model comprises:
generating a lexicon for use in a speech recognition engine.

28. The method of claim 23 wherein generating a user-specific NE model comprises:
linking the user-specific NE model to controls.

29. A computer readable medium having stored thereon computer readable instructions which, when executed by the computer cause the computer to perform steps of:
receiving information from a plurality of different information sources, the information being indicative of a specific user's usage of named entities (NEs);
generating a list of NEs in the information;
calculating probabilities associated with each NE in the list based on the information; and
integrating the NE list and probabilities into a computer component.

30. The computer readable medium of claim 29 wherein calculating probabilities comprises:
weighting the information based on how closely a source of the information is indicative of the specific user's usage of NEs.

* * * * *